US012336627B2

(12) United States Patent
Neidhöfer et al.

(10) Patent No.: US 12,336,627 B2
(45) Date of Patent: Jun. 24, 2025

(54) SLIDE FOR A LINEAR GUIDE, AND LINEAR GUIDE COMPRISING SUCH A SLIDE

(71) Applicant: Accuride International GmbH, Diez (DE)

(72) Inventors: Patrick Neidhöfer, Seelbach (DE); Christoph Neuhaus, Niederelbert (DE); Thomas Quirein, Diez (DE)

(73) Assignee: ACCURIDE INTERNATIONAL GMBH, Diez (DE)

( * ) Notice: Subject to any disclaimer, the term of this patent is extended or adjusted under 35 U.S.C. 154(b) by 126 days.

(21) Appl. No.: 17/919,298

(22) PCT Filed: Apr. 8, 2021

(86) PCT No.: PCT/EP2021/059127
§ 371 (c)(1),
(2) Date: Oct. 17, 2022

(87) PCT Pub. No.: WO2021/209301
PCT Pub. Date: Oct. 21, 2021

(65) Prior Publication Data
US 2023/0160424 A1    May 25, 2023

(30) Foreign Application Priority Data

Apr. 17, 2020   (DE) .................... 10 2020 110 563.0

(51) Int. Cl.
*A47B 88/473*   (2017.01)
*F16C 29/00*   (2006.01)
(Continued)

(52) U.S. Cl.
CPC .......... *A47B 88/473* (2017.01); *F16C 29/007* (2013.01); *F16C 29/045* (2013.01);
(Continued)

(58) Field of Classification Search
CPC ..... A47B 88/473; A47B 88/40; A47B 88/467; A47B 88/493; A47B 88/477;
(Continued)

(56) References Cited

U.S. PATENT DOCUMENTS 2,250,895 A * 7/1941 Premo .................... A47B 88/57
312/334.11
2,267,043 A * 12/1941 Premo .................. A47B 88/493
312/331
(Continued)

FOREIGN PATENT DOCUMENTS

CN      110168239 A       8/2019
CN      117016989 A  *  11/2023
(Continued)

OTHER PUBLICATIONS

JP6392176 translation (Year: 2018).*
(Continued)

*Primary Examiner* — Hiwot E Tefera
(74) *Attorney, Agent, or Firm* — PAUL & PAUL

(57) ABSTRACT

The invention relates to a slide for a linear guide which has the slide and a rail element with two running surfaces facing each other. The slide has a main part and a plurality of rolling bodies, and the plurality of rolling bodies are received on the main part such that the plurality of rolling bodies can roll at least on the two running surfaces or carry out a sliding movement relative to the two running surfaces. The main part defines the position of each one of the plurality of rolling bodies in a pull-out direction relative to the main part, wherein the slide additionally has two slide elements and a spring element, and each of the two slide elements is mounted on the main part such that it can move in a vertical direction perpendicular to the pull-out direction so that each of the two slide elements can be brought into frictional engagement with a respective running surface, the (Continued)

spring element being supported on the main part such that the spring element biases the two slide elements away from each other in the vertical direction.

18 Claims, 6 Drawing Sheets

(51) Int. Cl.
F16C 29/04 (2006.01)
F16C 29/12 (2006.01)
A47B 88/437 (2017.01)

(52) U.S. Cl.
CPC .......... *F16C 29/046* (2013.01); *F16C 29/048* (2013.01); *F16C 29/123* (2013.01); *F16C 29/126* (2013.01); *A47B 88/437* (2017.01); *A47B 2210/0035* (2013.01)

(58) Field of Classification Search
CPC .... A47B 2210/0097; A47B 2210/0018; A47B 88/57; A47B 88/487; A47B 88/437; A47B 2210/0035; F16C 29/123; F16C 29/045; F16C 29/046; F16C 29/048; F16C 29/10; F16C 29/126; F16C 29/007; F16C 2314/72; F16C 29/02
See application file for complete search history.

(56) References Cited

U.S. PATENT DOCUMENTS

| | | | | |
|---|---|---|---|---|
| 3,801,166 | A * | 4/1974 | York | A47B 88/407 |
| | | | | 312/334.44 |
| 5,356,207 | A * | 10/1994 | Rock | A47B 88/467 |
| | | | | 312/334.42 |
| 6,113,204 | A | 9/2000 | Jahrling et al. | |
| 6,478,466 | B1 * | 11/2002 | Chang | F16C 29/04 |
| | | | | 312/334.17 |
| 7,104,692 | B1 * | 9/2006 | Lu | F16C 29/04 |
| | | | | 384/49 |
| 7,458,651 | B1 * | 12/2008 | Radke | A47B 88/467 |
| | | | | 312/334.46 |
| 8,876,230 | B2 * | 11/2014 | Lowe | A47B 88/49 |
| | | | | 312/319.1 |
| 10,124,706 | B2 | 11/2018 | Zimmermann | |
| 11,067,122 | B2 | 7/2021 | Neuhaus et al. | |
| 11,464,333 | B2 | 10/2022 | Meusburger et al. | |
| 2006/0043851 | A1 * | 3/2006 | Lee | A47B 88/467 |
| | | | | 312/333 |
| 2007/0278920 | A1 * | 12/2007 | Chen | H04M 1/0237 |
| | | | | 312/334.44 |
| 2011/0081104 | A1 * | 4/2011 | Chiang | A47B 88/487 |
| | | | | 384/19 |
| 2012/0020593 | A1 * | 1/2012 | Rehage | A47B 88/57 |
| | | | | 384/54 |
| 2014/0318422 | A1 * | 10/2014 | Neuhaus | F16M 11/043 |
| | | | | 108/44 |
| 2017/0175811 | A1 * | 6/2017 | Zimmermann | A47B 88/497 |
| 2018/0289155 | A1 * | 10/2018 | Hutton | B60R 11/00 |
| 2018/0319297 | A1 | 11/2018 | Traiser et al. | |
| 2018/0372154 | A1 * | 12/2018 | Moshammer | F16C 29/02 |

FOREIGN PATENT DOCUMENTS

| | | | |
|---|---|---|---|
| DE | 4325045 A1 | 2/1995 | |
| DE | 29803210 U1 | 5/1998 | |
| DE | 202009001962 U1 | 5/2010 | |
| DE | 102014220049 A1 | 4/2016 | |
| DE | 202015106016 U1 | 3/2017 | |
| JP | 2004232783 A * | 8/2004 | ............ B23Q 1/28 |
| JP | 2007232048 A | 9/2007 | |
| JP | 6392176 B2 * | 9/2018 | |
| KR | 920001182 Y1 * | 2/1992 | |
| WO | 2019148216 A1 | 8/2019 | |

OTHER PUBLICATIONS

Nora Lindner, The International Bureau of the World Intellectual Property Organization, International Preliminary Report on Patentability, Dated Oct. 13, 2022, PCT/EP2021/059127 (English translation).

Hubei Center for Patent Examination Cooperation, China National Intellectual Property Administration, Office Action Dated Feb. 13, 2025, Chinese Patent Application No. 202180028344.1.

* cited by examiner

SLIDE FOR A LINEAR GUIDE, AND LINEAR GUIDE COMPRISING SUCH A SLIDE

CROSS-REFERENCE TO RELATED APPLICATIONS

This application is a national phase application of International Application PCT/EP2021/059127, filed Apr. 8, 2021, and claims the priority of German Application No. 10 2020 110 563.0, filed on Apr. 17, 2020.

The present invention relates to a slide for a linear guide, wherein the linear guide comprises such a slide and a rail element having two running surfaces which face one another, wherein the slide comprises a main part and a plurality of rolling bodies, wherein the plurality of rolling bodies is received on the main part such that the plurality of rolling bodies can roll on the two running surfaces of the rail element or carry out a sliding movement relative to the two running surfaces, wherein the main part defines a position of each one of the plurality of rolling bodies in a pull-out direction relative to the main part.

The present invention further relates to a linear guide comprising such a slide and a rail element.

Linear guides comprising a slide and a rail element, wherein rolling bodies fixed to the slide are provided between the slide and the running surfaces of the rail element, are known from the prior art. They are used in various household appliances, but also in the automotive industry and in many other applications. In order to enable the slide to be moved relative to the rail element with as little friction as possible, rolling bodies are disposed between the rail element and the slide, whereby, during a relative movement of the slide and the rail element, the rolling bodies roll on the surface of the running surfaces of the rail element or carry out a sliding movement relative to the surface of the running surfaces. The resulting rolling and/or sliding friction is less than a direct sliding friction between the slide and the rail element. However, in such a design of a linear guide, it is difficult to precisely adjust the force required to move the slide relative to the rail element. The position of the slide relative to the rail element cannot be precisely defined by the rolling bodies either.

There is therefore a need for a slide for a linear guide and a linear guide comprising such a slide, which reduces the disadvantages of the linear guides of the prior art.

To solve this problem, the invention proposes a slide for a linear guide of the aforementioned type, wherein the slide further comprises two slide elements and a spring element, wherein each of the two slide elements is mounted on the main part such that it can move in a vertical direction perpendicular to the pull-out direction, so that each of the two slide elements is respectively in frictional engagement with one of the running surfaces, and wherein the spring element is mounted on the main part such that the spring element biases the two slide elements away from one another in the vertical direction.

The underlying idea of the present invention is to provide at least two slide elements on the slide in addition to the plurality of rolling bodies, whereby said slide elements are biased against the running surfaces of the rail element by a spring element also provided on the slide. The key for the design according to the invention is that both slide elements are biased by this exactly one spring element. Thus, a defined frictional force is provided between the slide, i.e., the slide elements provided on the slide, and the rail element. The two slide elements also position the slide.

The two slide elements and the spring element form a functional unit, because exactly one spring element biases the two slide elements away from one another and thus onto the running surfaces of the rail element.

The present invention relates first to such a slide for a linear guide, independent of the rail element needed for the linear guide as a whole.

In one embodiment of the invention, the main part of the slide is made of metal or plastic. An embodiment of the main part made of plastic in particular makes it possible to produce the main part in large quantities at low cost, preferably in one piece, for example by injection moulding. Plastic also makes it possible to reduce the weight.

When the linear guide is installed, elements, such as a drawer in a motor vehicle, are mounted on the main part. For this purpose, the main part in one embodiment comprises threaded bores or holes, through which screws extend for fastening further elements.

A rolling body in the sense of the present application is understood to be a rotating body which, as an element of a guide, significantly reduces the friction between the slide and the rail element and thus facilitates a relative movement of the slide relative to the rail element. Examples of rolling bodies are balls, rollers, barrels, needles or cones.

The main part of the slide also serves as a cage for the rolling bodies, in that the main part defines the positions of the rolling bodies in the pull-out direction relative to the main part.

In the sense of the present application, the pull-out direction refers to the direction in which the slide can be moved linearly relative to the rail element in the installed state.

In the sense of the present application, the vertical direction is understood to be a direction perpendicular to the pull-out direction, which extends substantially parallel to a rail back of the rail element. In other words, the vertical direction is parallel to the spring force that the spring element exerts on the two slide elements.

In one embodiment of the invention, the spring element and preferably also the slide elements are mounted on the main part in a floating manner in the vertical direction. This means that the spring element is supported in the vertical direction only on the two slide elements, but not on the main part of the slide. The spring force exerted on the two slide elements is thus independent of the exact position of the main part in the vertical direction. In particular, in one embodiment, the spring force exerted on the two slide elements is the same.

In one embodiment of the invention, the spring force exerted by the spring element to the slide elements is adjustably variable. Such an adjustability of the spring force can be realized both with a fixed mounting of the spring element on the main part and also with a floating mounting of the spring element relative to the main part. Adjustability of the spring element means that the spring force can be varied and set either before the slide is mounted or when the slide is already mounted to the rail element. In one embodiment of the invention, the spring force can be adjusted by adjusting the distance between the abutments for the spring element on the two slide elements for a given distance between the two running surfaces of the rail element. The installation space available for the spring between the two slide elements in the vertical direction can thus be adjusted and the spring bias of the slide elements can be varied.

In one embodiment of the invention, each of the two slide elements is disposed in the pull-out direction, preferably symmetrically, between two rolling bodies. If rolling bodies are provided in the pull-out direction to the left and right of the respective slide element, the slide element also performs a position-stabilizing function in terms of the positioning of the main part of the slide relative to the rail element.

In one embodiment of the invention, the slide comprises exactly four rolling bodies, whereby each of the two slide elements is disposed between two rolling bodies.

In one embodiment, each of the two slide elements is disposed symmetrically between at least two rolling bodies.

In one embodiment of the invention, the spring element is a spiral spring. Spiral springs are easy and inexpensive to manufacture and can be installed with a defined spring force. In one embodiment of the invention, the spiral spring is supported both on the one and on the other slide element and pushes them away from one another toward the running surfaces of the rail element. Furthermore, in one embodiment, the spring element does not introduce any forces into the main part of the slide.

In one embodiment of the invention the two slide elements are made of plastic, preferably by means of injection moulding.

In one embodiment of the invention, the slide element comprises a T-shaped portion, wherein the crossbar of the T-shape forms the part of the slide element which comes into sliding engagement with the respective running surface of the rail element. The vertical bar, on the other hand, serves to receive the spring element. If the spring element is a spiral spring, in one embodiment the vertical bar extends into the interior of the spiral spring.

In one embodiment, the slide element comprises at least one, in particular but two, preferably cylindrical guide pins. This guide pin engages in a respective, preferably hollow cylindrical, guide bushing in the main part of the slide, so that the slide element is guided in the pull-out direction while it is mounted in a floating manner in the vertical direction.

At least one of the aforementioned objects is also achieved by a linear guide, wherein the linear guide comprises a rail element having two running surfaces which face one another and a slide in one of the embodiments as described above. The plurality of rolling bodies is received on the main part such that the plurality of rolling bodies rolls on the two running surfaces or carries out a sliding movement relative to the two running surfaces, so that the slide and the rail element can be moved linearly relative to one another in the pull-out direction, wherein each of the two slide elements is respectively in frictional engagement with one of the running surfaces.

A linear guide in the sense of the present invention, is understood to mean any arrangement of at least one slide and at least one rail element, wherein the slide and the rail element can be moved relative to one another along a linear path. A partial extension and a full extension in particular respectively represent one embodiment of a linear guide.

In one embodiment of the invention, the rail element comprises a projection and the main part comprises a latching portion. The projection is disposed and configured to extend into an intermediate space between the two running surfaces of the rail element, wherein the latching portion is elastically deformable in a direction perpendicular to the pull-out direction and wherein the latching portion is disposed such that it is in frictional engagement with the projection in a position of the slide in the pull-out direction relative to the rail element. The slide can thus be latched relative to the rail element at one or more positions in the pull-out direction with little effort.

While the combination of projection and latching portion are initially considered to be an option for the linear guide according to the invention, a linear guide comprising a slide and a rail element, wherein the slide comprises the latching portion and the rail element comprises the projection as described in detail in following, also constitutes an independent invention without the slide necessarily having the characterizing features of independent claim 1 of this application.

The present application therefore also relates to a linear guide comprising a rail element having two running surfaces which face one another and a slide, wherein the slide comprises a main part and a plurality of rolling bodies, wherein the plurality of rolling bodies is received on the main part such that the plurality of rolling bodies rolls on the second running surfaces of the rail element, wherein the main part defines a position of each one of the plurality of rolling bodies in the pull-out direction relative to the main part, wherein the rail element comprises a projection and the main part comprises a latching portion, wherein the projection is disposed and configured such that it projects into an intermediate space between the two running surfaces, wherein the latching portion is elastically deformable in a direction perpendicular to the pull-out direction and wherein the latching portion is disposed such that it is in frictional engagement with the projection in a position of the slide in the pull-out direction relative to the rail element.

In one embodiment of the invention, the rail element is made at least in sections of metal, in particular steel or aluminium, or plastic.

If the rail element is a rail element made of steel, in one embodiment the projection is realized as a bead or as an indentation in the rail back of the rail element.

An embodiment in which the rail element comprises a projection is in particular suitable for implementation with a slide comprising a main part made of plastic. In one embodiment of the invention, the latching portion is elastically deformable in a direction perpendicular to the pull-out direction and perpendicular to the vertical direction. The latching portion can be realized by a thinned plastic section that can be elastically deformed, for example.

In one embodiment of the invention, the rail element comprises a retaining tab at least on a first end in the pull-out direction and the main part of the slide comprises a recess in an end face of the main part, wherein the retaining tab projects into the intermediate space between the two running surfaces and wherein the retaining tab and the recess are configured and disposed such that the retaining tab engages in the recess in the main part of the slide when the slide reaches the first end, so that the slide cannot be disengaged from the rail element in a direction perpendicular to the pull-out direction and perpendicular to the vertical direction. A disengagement protection means is thus implemented. The disengagement protection means is in particular suitable for linear guides with high dynamics or for dissipating large loads.

In a further embodiment, on the first end, the rail element comprises a tab which extends perpendicular to the pull-out direction of the rail element, wherein the tab comprises a notch and, on its end face, the slide comprises a projection which corresponds to the notch and wherein the notch and the projection are configured and disposed such that the projection engages in the notch in the tab when the slide reaches the first end, so that the slide cannot be disengaged from the rail element in a direction perpendicular to the pull-out direction and perpendicular to the vertical direction.

While the combination of retaining tab and hole are initially considered to be an option for the linear guide according to the invention, a linear guide comprising a slide and a rail element, wherein the slide comprises the hole and the rail element comprises the retaining tab as described in detail in following, also constitutes an independent invention without the slide necessarily having the characterizing features of independent claim 1 of this application.

The present application therefore also relates to a linear guide comprising a rail element having two running surfaces which face one another and a slide, wherein the slide comprises a main part and a plurality of rolling bodies, wherein the plurality of rolling bodies is received on the main part such that the plurality of rolling bodies rolls on the second running surfaces of the rail element, wherein the main part defines a position of each one of the plurality of rolling bodies in the pull-out direction relative to the main part, wherein at least the rail element comprises a retaining tab at least on a first end in the pull-out direction and the main part of the slide comprises a hole in an end face of the main part, wherein the retaining tab projects into the intermediate space between the two running surfaces and wherein the retaining tab and the hole are configured and disposed such that the retaining tab engages in the hole in the main part of the slide when the slide reaches the first end, so that the slide cannot be disengaged from the rail element in a direction perpendicular to the pull-out direction and perpendicular to the vertical direction or, on the first end, the rail element comprises a tab which extends perpendicular to the pull-out direction of the rail element, wherein the tab comprises a notch and on its end face, the slide comprises a projection which corresponds to the notch and wherein the notch and the projection are configured and disposed such that the projection engages in the notch in the tab when the slide reaches the first end, so that the slide cannot be disengaged from the rail element in a direction perpendicular to the pull-out direction and perpendicular to the vertical direction.

In a further embodiment of the invention, the rail element comprises a rail back which is preferably made of metal at least in sections, wherein the rail element comprises a retaining tab at least on a first end in the pull-out direction, wherein the retaining bar is bent relative to the rail back such that the retaining tab projects into the intermediate space between the two running surfaces, wherein the retaining tab and the main part are configured and disposed such that the main part strikes the retaining tab when it reaches the first end. Such a retaining tab has the advantage that it can absorb high forces in the pull-out direction without the main part being able to deform or bend the retaining tab in the pull-out direction.

In one embodiment, the retaining tab is bent relative to the rail back such that the retaining tab includes an angle of less than 90° with the rail back. Such a configuration of the retaining tab is capable of absorbing large forces in the pull-out direction.

While this is initially considered to be an option for the linear guide according to the invention, a linear guide comprising a slide and a rail element, wherein the rail element comprises the thus configured retaining tab as described in detail in following, also constitutes an independent invention without the slide necessarily having the characterizing features of independent claim 1 of this application.

The present application therefore also relates to a linear guide comprising a rail element having two running surfaces which face one another and a slide, wherein the slide comprises a main part and a plurality of rolling bodies, wherein the plurality of rolling bodies is received on the main part such that the plurality of rolling bodies rolls on the second running surfaces of the rail element, wherein the main part defines a position of each one of the plurality of rolling bodies in the pull-out direction relative to the main part, the rail element comprises a rail back which is preferably made of metal at least in sections, wherein the rail element comprises a retaining tab at least on a first end in the pull-out direction, wherein the retaining bar is bent relative to the rail back such that the retaining tab projects into the intermediate space between the two running surfaces, wherein the retaining tab and the main part are configured and disposed such that the main part strikes the retaining tab when it reaches the first end, and wherein the retaining tab is preferably bent relative to the rail back such that the retaining tab includes an angle of less than 90° with the rail back. Such a retaining tab has the advantage that it can absorb high forces in the pull-out direction without the main part being able to deform or bend the retaining tab in the pull-out direction.

In a further embodiment of the invention, a stop is provided on the first end of the rail element in addition to the retaining tab, as described above in embodiments thereof, wherein an elastically deformable damping element is provided on the slide or on the stop, wherein the slide, the damping element and the stop are configured and disposed such that, upon reaching the first end, the slide comes into engagement with the damping element and the damping element comes into engagement with the stop, so that a pull-out movement of the slide relative to the rail element is braked, and wherein the slide, the damping element, the stop and the retaining tab are configured and disposed such that the slide comes into engagement with the retaining tab only when a force predetermined by the damping element is exceeded.

Such an embodiment enables a comfortable end stop for the user of the linear guide when the first end of the rail element, which is damped by the damping element, is reached. At the same time, the retaining tab provides an overload stop when a force predetermined by the damping element is exceeded. In one embodiment, this overload stop provides an effective limitation of the displacement path of the slide relative to the rail element in the pull-out direction. In one embodiment, the overload stop alternatively or additionally provides a disengagement protection means against separation of the slide from the rail element.

Further advantages, features, and possible applications of the present invention will become apparent from the following description of embodiments and the associated figures. In the figures, the same elements are identified with the same reference signs.

Figure 1:
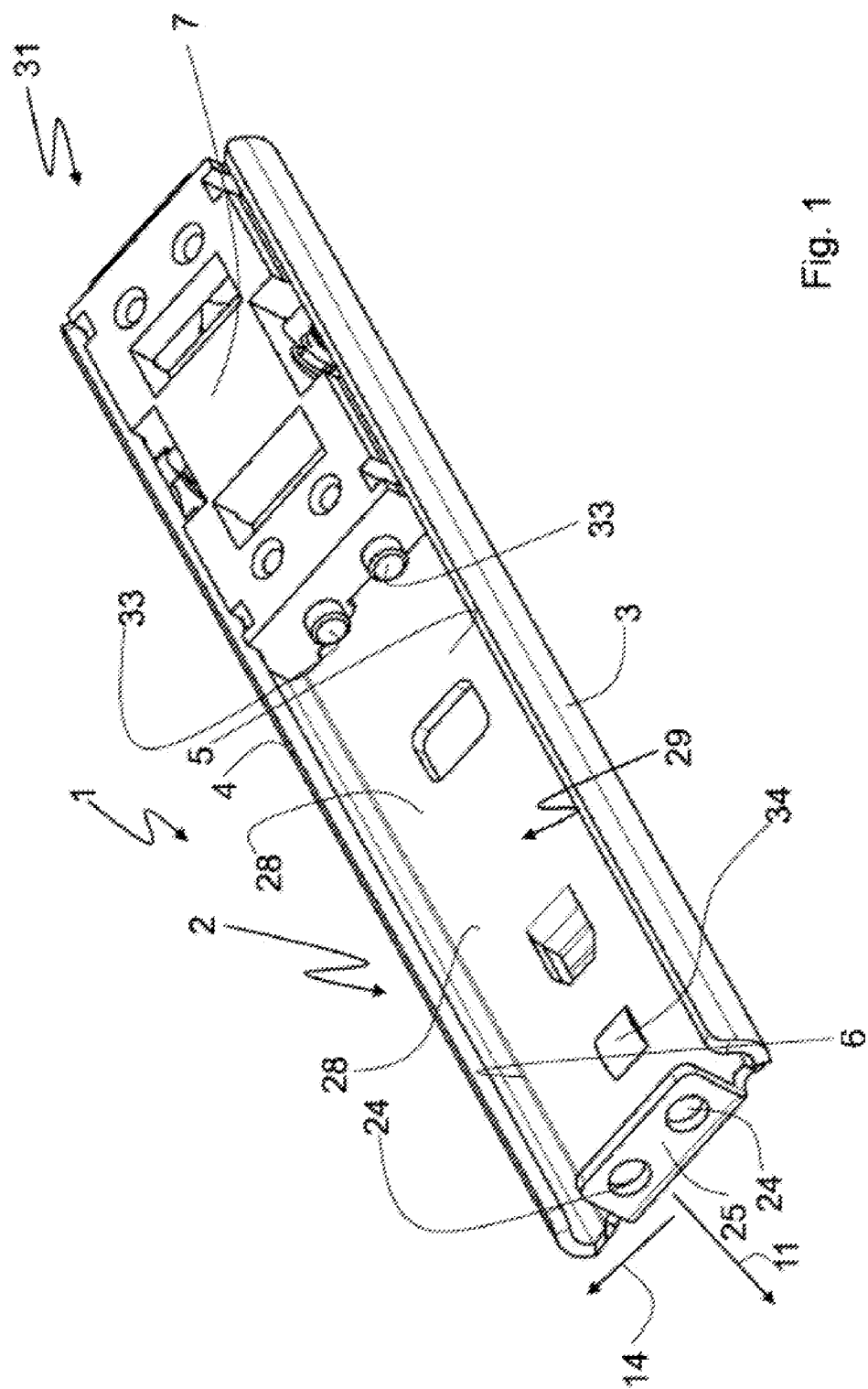
FIG. 1 is a schematic isometric view of an embodiment of a linear guide according to the invention.

FIG. 1 is a schematic isometric view of an embodiment of a linear guide 1 comprising a rail element 2 and a slide 31.

Figure 2:
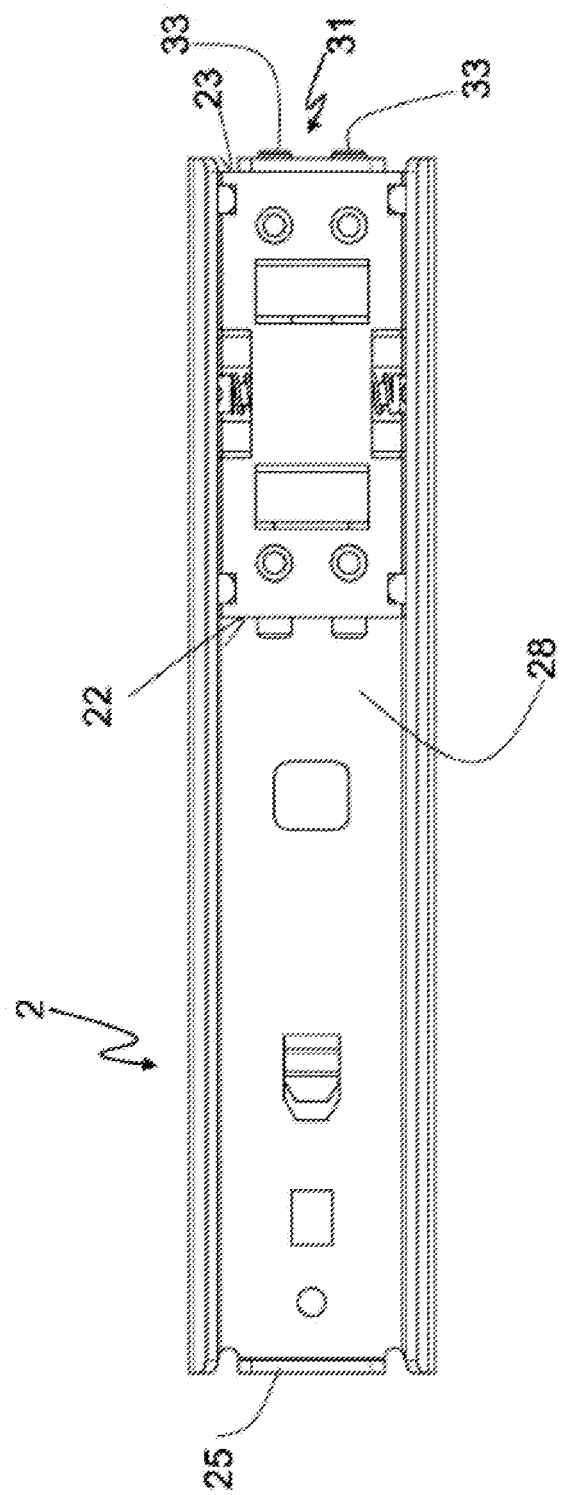
FIG. 2 is a schematic side plan view onto the linear guide of FIG. 1.
Figure 3:
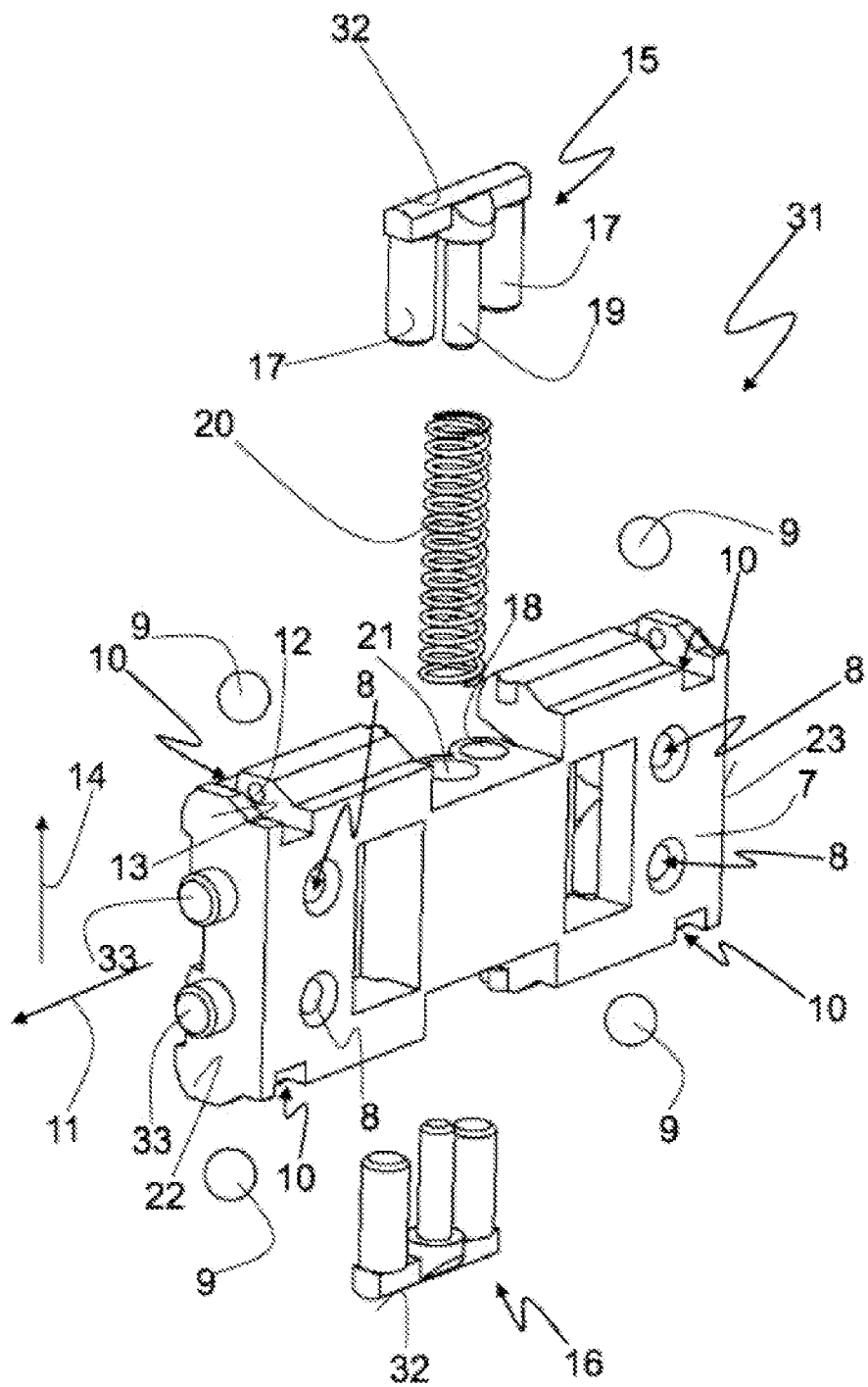
FIG. 3 is an exploded view of the slide of FIGS. 1 and 2.

The same linear guide is shown in a side plan view in FIG. 2. FIG. 3 shows slide 31 in an exploded view.

The slide 31 and the rail element 2 are mounted on one another such that they can be moved relative to one another. The rail element 2 is C-shaped in cross-section. The rail element 2 comprises two legs 3, 4. Each of the two legs 3, 4 comprises a respective running surface 5, 6, whereby the two running surfaces 5, 6 face one another. The two legs 3, 4 are connected to one another by a rail back 28. The slide 31 comprises a main part 7 which, in the shown embodiment, is made of plastic by injection moulding. Holes 8 are provided in the main part 7 for screwing elements that do not belong to the actual linear guide, such as a drawer in a motor vehicle, to the main part 7 of the slide 31.

In order to enable a displacement movement of the slide 31 relative to the rail element 2 with as little friction as possible, a total of four balls 9 are received as rolling bodies in corresponding recesses 10 on the main part 7. In the assembled state, these bearing balls 9 roll on the running surfaces 5, 6 of the two legs 3, 4 of the rail element 2 or slide on said running surfaces 5, 6. The balls 9 are received on the main part 7 of the slide 31 in the manner of a rolling element cage or ball cage. In other words, the main part 7 defines the position of the balls 9 in the pull-out direction 11. In the shown embodiment, the balls 9 are received within the recesses 10 in holes 12 in the lateral wall surfaces 13 of the main part 7, so that the balls 9 have at most a circular line contact with the main part 7 on their right and left sides, but no full-surface frictional engagement with the main part 7. As a result of this design, the balls roll on the running surfaces 5, 6 of the rail element 2 with little rolling friction despite their guidance on the slide 31. However, this mounting of the balls 9 on the main part 7 of the slide 31 also results in the balls 9 having play in the vertical direction 14, so that the position of the slide 31 in the vertical direction is not completely fixed. The vertical direction 14 is understood to be a direction parallel to the rail back 28 and perpendicular to the pull-out direction 11.

To counteract this and to additionally provide a defined frictional force between the slide 31 and the rail element 2, the slide 31 comprises two slide elements 15, 16.

Each of the two slide elements 15, 16 comprises a sliding surface 32 which, when the slide 31 is installed, respectively slides on one of the running surfaces 5, 6 of the rail element 2 and provides a defined sliding friction between the slide 7 and the rail element 2. Each slide element 16 further comprises two cylindrical guide pins 17. These guide pins 17 engage in two hollow cylindrical bearing bushings 18 in the main part 7 of the slide 31. The slide elements 15, 16 are thus mounted on the main part 7 of the slide 31 such that they can be moved in the vertical direction 14, while the combination of guide pins 17 and bearing bushings 18 provides guidance in the pull-out direction 11. Each of the slide elements 15 further comprises a spring receptacle 19 in the form of a cylindrical pin.

A spring element in the form of a spiral spring 20 is provided on the slide 31 as well. This spiral spring 20 is received in a guide bushing 21 in the side wall of the main part 7 of the slide 31, whereby the guide bushing 21 for the spiral spring 20 extends in the vertical direction 14 of the slide 31. The guide bushing 21 guides the spiral spring in a direction parallel to the pull-out direction. In the vertical direction 14, on the other hand, the spiral spring 20 is mounted in a floating manner in the bushing 21. In the assembled state, the receiving pin 19 engages in the spiral spring 20. The spiral spring 20 therefore biases the two slide elements 15 with exactly the same spring force toward the two running surfaces 5, 6 of the rail element 2. The spring force that acts on the slide elements and thus on the running surfaces 5, 6 of the rail element 2 is independent of the exact position of the slide 31 in the vertical direction 14 relative to the rail element 2.

Two cylindrical disengagement locks or projections 33 are provided on each of the two end surfaces 22, 23 of the main part 7 of the slide 31. When the slide 31 reaches the one or the other end of the rail element 2, the disengagement locks 33 engage in corresponding hollow cylindrical notches 24 in end stop tabs 25 of the rail element 2. In both end positions, the slide 31 is secured by the engagement of the disengagement locks 33 in the complementary notches 24 in the tabs 25.

Figure 6:
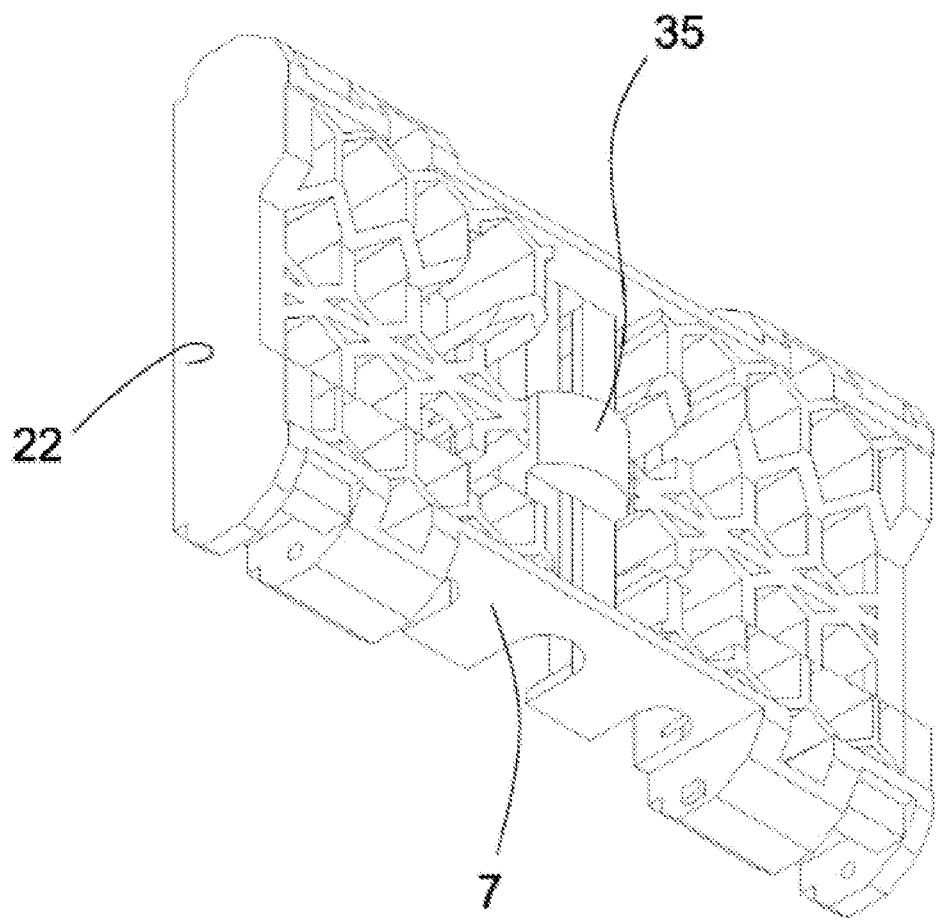
FIG. 6 is a schematic isometric view from the rear onto a main part of a slide according to the invention.

The linear guide 1 according to FIGS. 1 to 3 further comprises a catch, wherein the catch consists of a projection 34 on the rail element 2 and a latching element 35. The latching element 35 is shown in the rear view of a main part 7 of a slide 31 of FIG. 6. The latching element 35 is disposed on the side of the main part 7 of the slide 31 facing the rail back 28. The latching element 35 is a projecting plastic section of the main part 7 of the slide 31. The latching element 35 is disposed in the vertical direction 14 in the same position as the projection 30 on the rail back 28. The projection 30 is configured such that it projects into the intermediate space 29 formed between the running surfaces 5, 6. If the slide 31 now comes into a position in the pull-out direction 11 at which the projection 30 comes into frictional engagement with the latching element 35, the projection 30 elastically deforms the latching element 35 and, in cooperation, the projection 30 and the latching element fix the position of the slide 31 in the pull-out direction 11 by latching. The slide 31 can only be moved further by the user when the latching force provided by the latching element is overcome.

Figure 4:
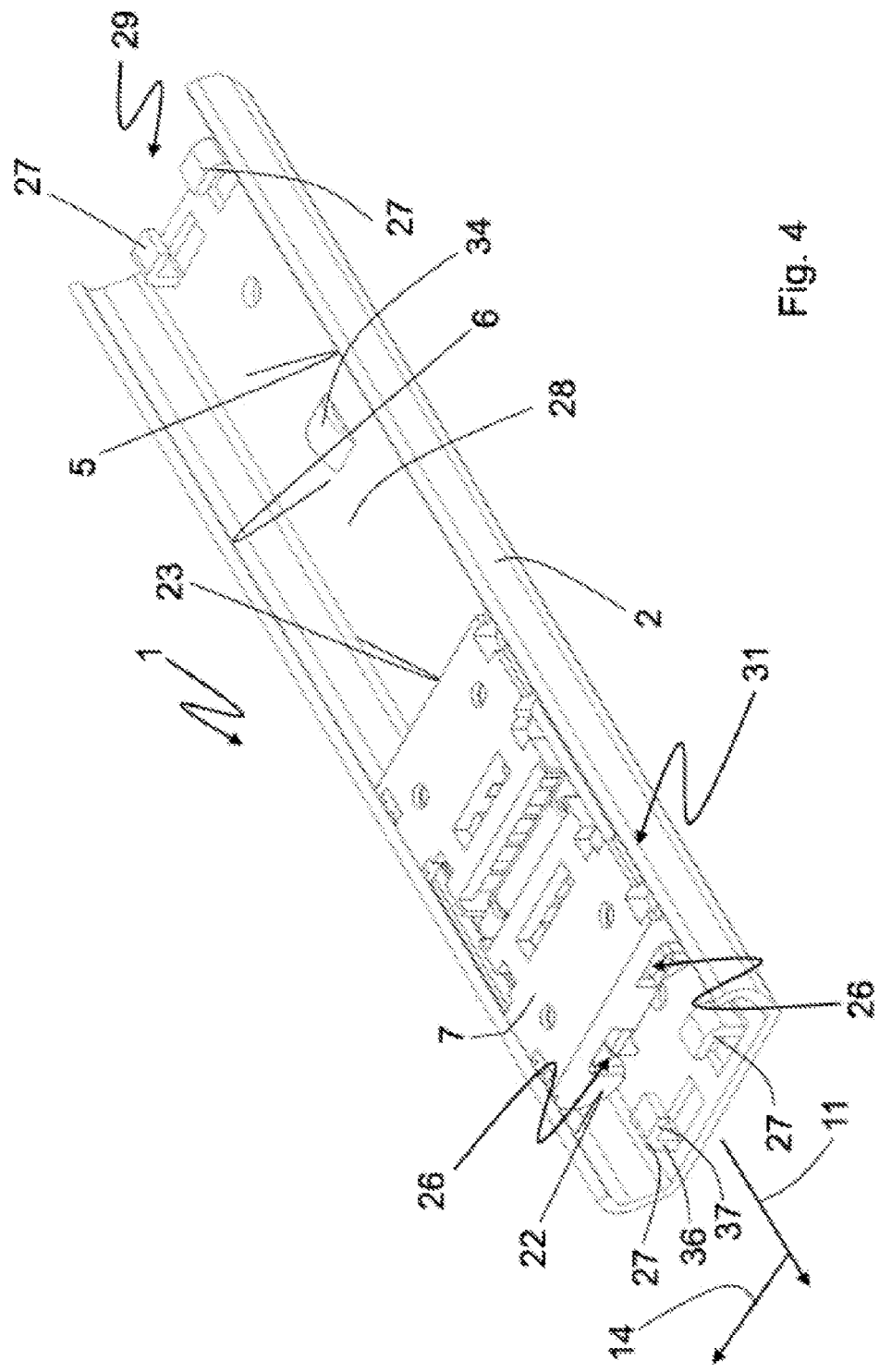
FIG. 4 is a schematic isometric view of another embodiment of a linear guide according to the invention.

FIG. 4 shows an alternative embodiment of the linear guide 1, which differs from the embodiment according to FIGS. 1 to 3 by the configuration of the disengagement protection means.

In this case, the disengagement protection means is formed by two L-shaped recesses 26 in each of the end surfaces 22, 23 of the main part 7 of the slide 31. The rail element 2 in turn comprises two L-shaped retaining tabs 27 at each end as part of the disengagement protection means. The retaining tabs 27 fit complementarily into the recesses 26 in the main part 7 of the slide 31.

In the shown embodiment, the rail element 2 is made of a bent steel sheet, so that the retaining tabs 27 are created by partially punching or cutting out and bending the retaining tabs 27 relative to the rail back 28. The retaining tabs 27 are bent such that they project into the intermediate space 29 between the running surfaces 5, 6 of the rail element 2. A first leg 36 of the L-shaped retaining tab 27 extends substantially perpendicular to the rail back 28 and a second leg 37 extends substantially parallel to the rail back 28. In the vertical direction 14, the retaining tabs 27 on the one hand and the notches 26 in the main part 7 of the slide 31 on the other hand are disposed such that, when the respective end of the rail element 2 is reached, the retaining tabs 27 engage in the recesses 26 and the legs 37 of the retaining tabs 27 which are parallel to the rail back 28 thus effectively prevent disengagement of the slide 31 from the rail element 2 in a direction perpendicular to the pull-out direction 11 and perpendicular to the vertical direction 14. The interaction of the retaining tabs 27 with the recesses 26 also creates an end stop for the slide when it reaches the end positions on the rail element 2.

Figure 5:
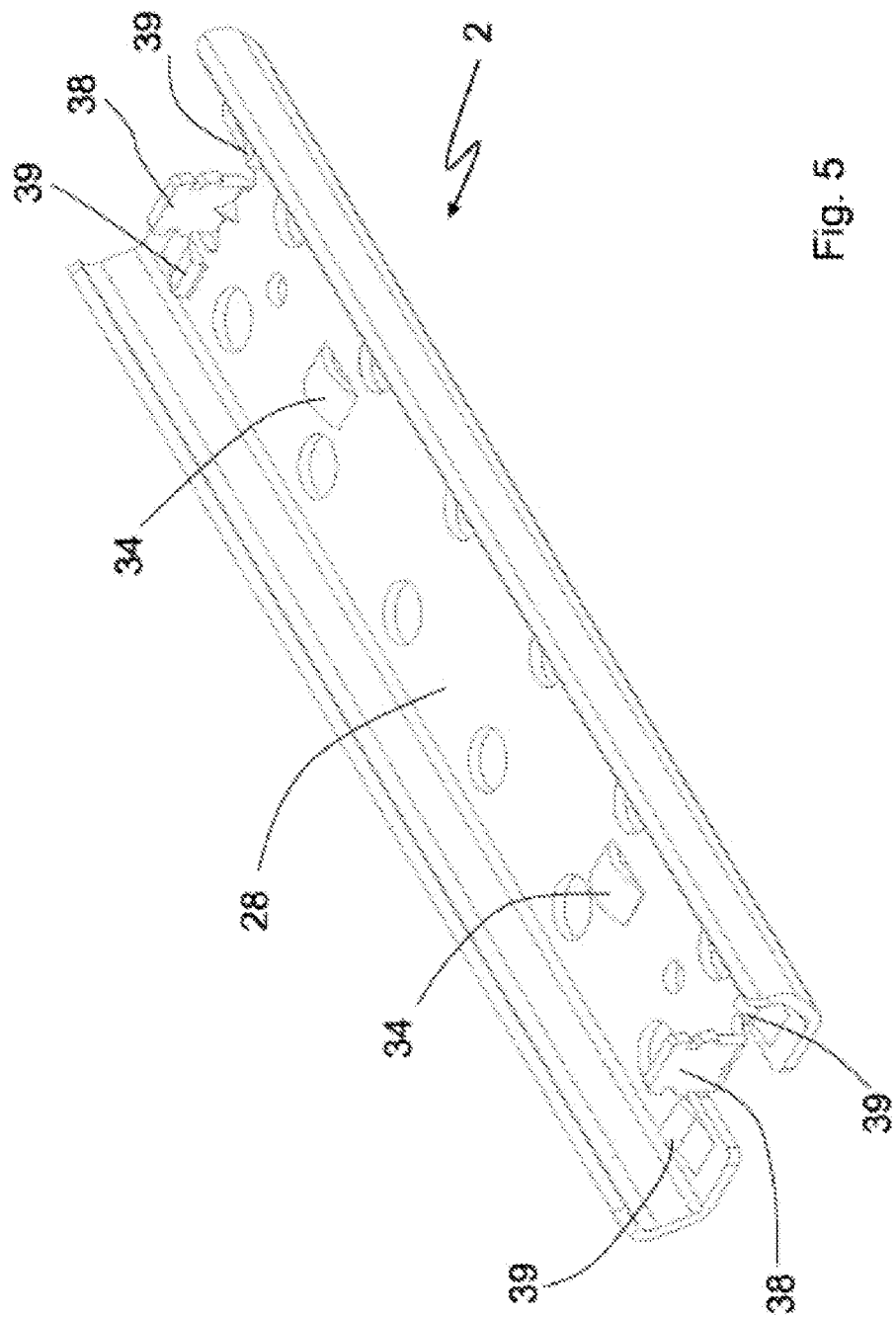
FIG. 5 is a schematic isometric view of another embodiment of a rail element for a linear guide according to the invention.

FIG. 5 shows an alternative embodiment of the rail element 2 without a disengagement protection means but with an end stop for the slide when it reaches the end position of the slide. On the rail side, the end stop is formed by a stop in the form of a stop tab 38 which is bent perpendicular relative to the rail back. A cap (not shown) made of an elastically deformable material is placed onto this stop tab. Impact of the slide against the stop tab 38 is thus dampened. In the typical operating situation, the stop tab 38 can absorb all of the forces introduced by the slide. However, overload situations can occur, in which the forces introduced by the slide onto the stop tab 38 in the pull-out direction 11 would lead to bending of the stop tab 38. Therefore a pair of retaining tabs 39 are disposed at each end of the rail element 2 in addition to the stop tab 38. The retaining tabs, too, are partially punched out of the material of the rail element and bent relative to the rail back. The retaining tabs 39 include an angle of less than 90° with the rail back 28 and their bent ends point toward the slide. Due to this design, the retaining tabs 39 can absorb significantly higher forces than the stop tabs 38 aligned at an angle of about 90° to the rail back 28. The stop tabs with their respective damper provide a pleasant, damped feel when the end of the displacement movement of the slide relative to the rail element 2 is reached. To ensure that the retaining tabs 39 and the impact of the slide on said tabs does not interfere with this feel in the normal operating situation, the slide 2, the damping element, the stop tab 38 and the retaining tabs 39 are positioned and shaped such that the slide 31 strikes the retaining tabs 39 only when a force predetermined by the damping element is exceeded. Therefore the slide 31 strikes the rail element 2 hard only in the event of an overload.

For the purpose of the original disclosure, it should be noted that all of the features as they become apparent to a person skilled in the art from the present description, the drawings and the claims, even if they have been specifically described only in connection with specific other features, can be combined both individually and in any combination with other features or groups of features disclosed here, insofar as this has not been expressly excluded or technical circumstances make such combinations impossible or pointless. A comprehensive, explicit presentation of all conceivable combinations of features is omitted here solely for the sake of brevity and legibility of the description.

Although the invention has been presented and described in detail in the drawings and the foregoing description, this representation and description is merely an example and is not intended to limit the scope of protection as defined by the claims. The invention is not limited to the disclosed embodiments.

Modifications of the disclosed embodiments will be obvious to those skilled in the art from the drawings, the description and the appended claims. In the claims, the word "comprise" does not exclude other elements or steps, and the indefinite article "a" does not exclude a plurality. The mere fact that certain features are claimed in different claims does not preclude their combination. Reference signs in the claims are not intended to limit the scope of protection.

LIST OF REFERENCE SIGNS

1 Linear guide
2 Rail element
3, 4 Legs
5 Running surface
6 Running surface
7 Main part
8 Holes
9 Balls
10 Recesses
11 Pull-out direction
12 Holes
13 Wall surfaces
14 Vertical direction
15, 16 Slide element
17 Guide pin
18 Bearing bushing
19 Spring receptacle
20 Spiral spring
21 Guide bushing
22, 23 End surface
24 Notch
25 End stop tab
26 Recess
27 Retaining tabs
28 Rail back
29 Intermediate space
30 Free end
31 Slide
32 Sliding surface
33 Disengagement lock
34 Projection
35 Latching element
36 First leg
37 Second leg
38 Stop tab
39 Retaining tabs

The invention claimed is:

1. A slide (31) for a linear guide (1) which comprises the slide (31) and a rail element (2) having two running surfaces (5, 6) which face one another, wherein the slide (31) comprises
a main part (7), and
a plurality of rolling bodies (9),
wherein the plurality of rolling bodies (9) are received on the main part (7) such that the plurality of rolling bodies (9) can roll at least on the two running surfaces (5, 6) or carry out a sliding movement relative to the two running surfaces (5, 6), wherein the main part (7) defines a position of each one of the plurality of rolling bodies (9) in a pull-out direction (11) relative to the main part (7),
characterised in that
the slide further comprises
two slide elements (15, 16), and
a spring element (20),
wherein each of the two slide elements (15, 16) is mounted on the main part such that each of the two slide elements can move in a vertical direction (14) perpendicular to the pull-out direction (11) so that each of the two slide elements (15, 16) can be brought into frictional engagement with a respective running surface (5, 6), and
wherein the spring element (20) is mounted on the main part (7) such that the spring element (20) biases the two slide elements (15, 16) away from one another in the vertical direction, and
wherein each of the two slide elements (15, 16) is disposed in the pull-out direction (11) between two rolling bodies (9).

2. The slide (31) according to claim 1, wherein the spring element (20) is mounted on the main part (7) in a floating manner in the vertical direction (14).

3. The slide (31) according to claim 1, wherein each of the two slide elements (15, 16) comprises at least one guide pin (17), wherein the guide pin (17) engages in a respective guide bushing (18) in the main part (7) of the slide (31), so that each of the two slide elements (15, 16) is guided in the pull-out direction (11) while each slide element is mounted in a floating manner in the vertical direction (14).

4. The slide (31) according to claim 3, wherein the at least one guide pin is a cylindrical guide pin (17).

5. The slide (31) according to claim 3, wherein the guide bushing is a hollow cylindrical bearing bushing.

6. The slide (31) according to claim 1, wherein the spring element (20) is a spiral spring.

7. The slide (31) according to claim 1, wherein the main part (7) is made of plastic.

8. A slide (31) for a linear guide (1) which comprises the slide (31) and a rail element (2) having two running surfaces (5, 6) which face one another, wherein the slide (31) comprises
    a main part (7), and
    a plurality of rolling bodies (9),
    wherein the plurality of rolling bodies (9) are received on the main part (7) such that the plurality of rolling bodies (9) can roll at least on the two running surfaces (5, 6) or carry out a sliding movement relative to the two running surfaces (5, 6),
    wherein the main part (7) defines a position of each one of the plurality of rolling bodies (9) in a pull-out direction (11) relative to the main part (7),
    characterised in that
    the slide further comprises
    two slide elements (15, 16), and
    a spring element (20),
    wherein each of the two slide elements (15, 16) is mounted on the main part such that each of the two slide elements can move in a vertical direction (14) perpendicular to the pull-out direction (11) so that each of the two slide elements (15, 16) can be brought into frictional engagement with a respective running surface (5, 6), and
    wherein the spring element (20) is mounted on the main part (7) such that the spring element (20) biases the two slide elements (15, 16) away from one another in the vertical direction, and
    wherein each of the two slide elements (15, 16) comprises a T-shaped portion,
    wherein a crossbar of the T-shaped portion can be brought into frictional engagement with the running surface (5, 6) of the rail element (2) and a vertical bar receives the spring element.

9. The slide (31) according to claim 8, wherein each of the two slide elements (15, 16) is disposed symmetrically between two rolling bodies (9).

10. A linear guide (1) comprising
    a rail element (2) having two running surfaces (5, 6) which face one another, and
    a slide (31), comprising
    a main part (7), and
    a plurality of rolling bodies (9),
    wherein the plurality of rolling bodies (9) are received on the main part (7) such that the plurality of rolling bodies (9) can roll at least on the two running surfaces (5, 6) or carry out a sliding movement relative to the two running surfaces (5, 6),
    wherein the main part (7) defines a position of each one of the plurality of rolling bodies (9) in a pull-out direction (11) relative to the main part (7),
    characterised in that
    the slide further comprises
    two slide elements (15, 16), and
    a spring element (20),
    wherein each of the two slide elements (15, 16) is mounted on the main part such that each of the two slide elements can move in a vertical direction (14) perpendicular to the pull-out direction (11) so that each of the two slide elements (15, 16) can be brought into frictional engagement with a respective running surface (5, 6), and
    wherein the spring element (20) is mounted on the main part (7) such that the spring element (20) biases the two slide elements (15, 16) away from one another in the vertical direction;
    wherein the plurality of rolling bodies (9) are received on the main part (7) such that the plurality of rolling bodies (9) rolls on the two running surfaces (5, 6) or carries out a sliding movement relative to the two running surfaces (5, 6), so that the slide (31) and the rail element (2) can be moved linearly relative to one another in the pull-out direction (11),
    wherein each of the two slide elements (15, 16) is respectively in frictional engagement with one of the running surfaces (5, 6);
    wherein the rail element (2) comprises a projection and the main part (7) comprises a latching element (35);
    wherein the projection is disposed and configured such that it projects into an intermediate space (29) between the two running surfaces (5, 6),
    wherein the latching element (35) is elastically deformable in a direction perpendicular to the pull-out direction (11); and
    wherein the latching element (35) is disposed such that it is in frictional engagement with the projection in a position of the slide (31) in the pull-out direction (11) relative to the rail element (2).

11. The linear guide (1) according to claim 10,
    wherein at least the rail element (2) comprises a retaining tab (27, 39) at least on a first end in the pull-out direction (11), and
    the main part (7) of the slide (31) comprises a recess (12, 26) in an end surface (22, 23) of the main part (7),
    wherein the retaining tab (27, 39) projects into the intermediate space (29) between the two running surfaces (5, 6), and
    wherein the retaining tab (27, 39) and the recess (12, 26) are configured and disposed such that the retaining tab (27, 39) engages in the recess (12, 26) in the main part (7) of the slide (31) when the slide (31) reaches the first end, so that the slide (31) cannot be disengaged from the rail element (2) in a direction perpendicular to the pull-out direction (11) and perpendicular to the vertical direction (14) or,
    at least at the first end, the rail element (2) comprises a tab (25) which extends perpendicular to the pull-out direction (11) of the rail element (2), wherein the tab (25) comprises a notch (24) and,
    on its end surface (22, 23), the slide (31) comprises a projection (33) which corresponds to the notch (24), and
    wherein the notch (24) and the projection of the slide (33) are configured and disposed such that the projection of the slide (33) engages in the notch (24) in the tab (25) when the slide (31) reaches the first end, so that the slide (31) cannot be disengaged from the rail element (2) in a direction perpendicular to the pull-out direction (11) and perpendicular to the vertical direction (14).

12. The linear guide (1) according to claim 11, wherein a stop tab (38) is provided on the first end of the rail element (2) in addition to the retaining tab (27, 39), wherein an elastically deformable damping element is provided on the slide (31) or on the stop tab (38), wherein the slide (31), the damping element and the stop tab (38) are configured and disposed such that, upon reaching the first end, the slide (31) comes into engagement with the damping element and the damping element comes into engagement with the stop tab (38), so that a pull-out movement of the slide (31) relative to the rail element (2) is braked, and wherein the slide (31), the damping element, the stop tab (38) and the retaining tab (27, 39) are configured and disposed such that the slide (31) comes into engagement with the retaining tab (27, 39) only when a force predetermined by the damping element is exceeded.

13. The linear guide (1) according to claim 10, wherein the rail element (2) comprises a rail back (2), wherein the rail element (2) comprises a retaining tab (27, 39) at least on a first end in the pull-out direction (11), wherein the retaining tab (27, 39) is bent relative to the rail back (2) such that the retaining tab (27, 39) projects into the intermediate space (29) between the two running surfaces (5, 6), wherein the retaining tab (27, 39) and the main part (7) are configured and disposed such that the main part (7) strikes the retaining tab (27, 39) when it reaches the first end, and wherein the retaining tab (27, 39) is bent relative to the rail element (2), such that the retaining tab (27, 39) includes an angle of less than 90° with the rail element (2).

14. The linear guide (1) according to claim 10, wherein the spring element (20) is mounted on the main part (7) in a floating manner in the vertical direction (14).

15. The linear guide (1) according to claim 10, wherein each of the two slide elements (15, 16) is disposed in the pull-out direction (11) between two rolling bodies (9).

16. The linear guide (1) according to claim 10, wherein each of the two slide elements (15, 16) comprises a T-shaped portion, wherein a crossbar of the T-shaped portion can be brought into frictional engagement with the running surface (5, 6) of the rail element (2) and a vertical bar receives the spring element.

17. The linear guide (1) according to claim 10, wherein each of the two slide elements (15, 16) comprises at least one guide pin (17), wherein the guide pin (17) engages in a respective bearing bushing (18) in the main part (7) of the slide (31), so that each of the two slide elements (15, 16) is guided in the pull-out direction (11) while it is mounted in a floating manner in the vertical direction (14).

18. The linear guide (1) according to claim 10, wherein the spring element (20) is a spiral spring.

* * * * *